March 9, 1948.　　　　　R. D. BOURNE　　　　　2,437,346
WINDMILL
Filed April 8, 1943　　　　　2 Sheets-Sheet 2
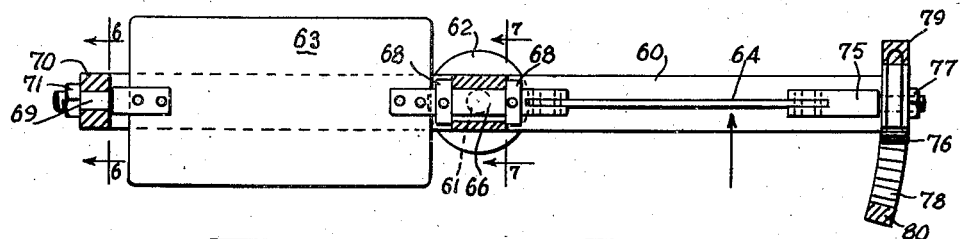
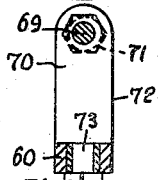
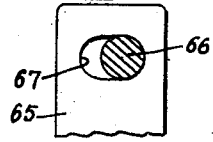
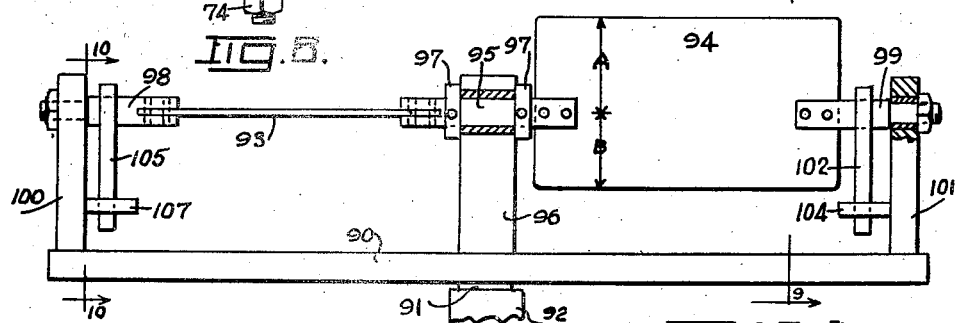
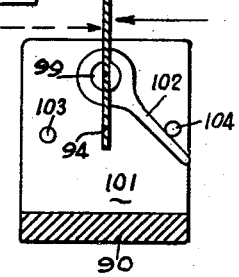
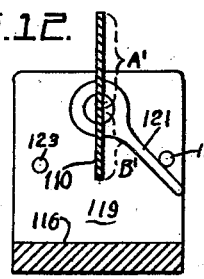
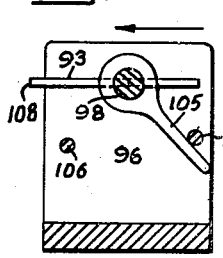
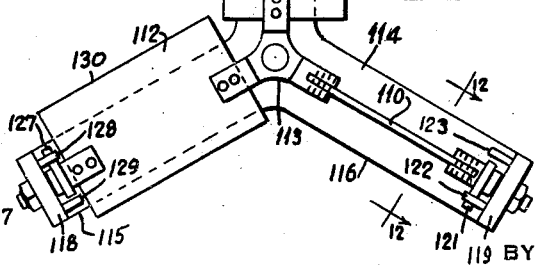
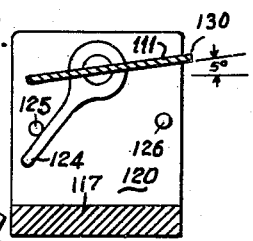
INVENTOR
RAYMOND D. BOURNE,
BY
Toulmin & Toulmin
ATTORNEYS Patented Mar. 9, 1948

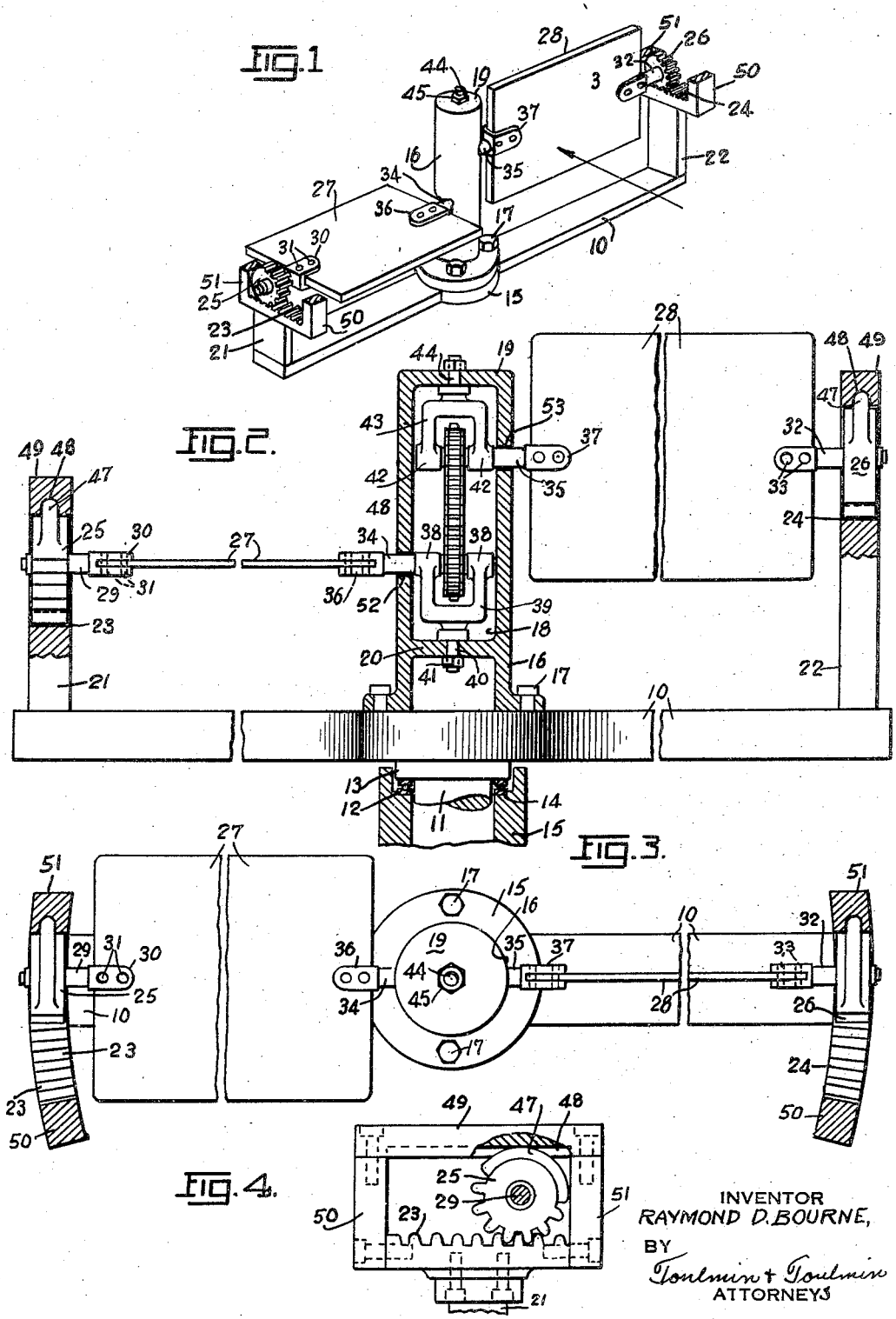

2,437,346

UNITED STATES PATENT OFFICE 2,437,346

WINDMILL

Raymond D. Bourne, Middletown, Ohio

Application April 8, 1943, Serial No. 482,240

4 Claims. (Cl. 170—27)

This invention relates to devices for deriving power from the wind.

An object of the invention is to provide an improved wind power mechanism that is able to produce a greater amount of power in proportion to its size than previous devices.

Another object of the invention is to provide a wind power mechanism that will always rotate in the same direction regardless of the direction of attack of the wind to the mechanism.

Another object of the invention is to provide a wind power unit that is constructed and arranged so that the power blades of the device are rotatable in a manner that they will be caught by the wind when moving down-wind and will lay parallel to the wind when moving up-wind.

Another object of the invention is to provide a wind power unit capable of driving a suitable power driven mechanism that is constructed and arranged so that the power blades when moving out of the down-wind will initiate movement of other power blades into their power position when moving into the wind.

It is a still further object of the invention to provide a wind power unit that is constructed and arranged in a manner that there will always be at least one power blade in a position to be driven by the wind.

It is another object of the invention to provide a wind power unit wherein the power blades will automatically set themselves to their power position when moving into the wind, and will automatically set themselves into a position parallel with the wind when moving against the wind.

Further objects and advantages will become apparent from the drawings and the following description.

In the drawings:

Figure 1 is a perspective elevational view of a wind power unit incorporating features of this invention.

Figure 2 is a vertical cross sectional view of the device disclosed in Figure 1.

Figure 3 is a top plan view of the device disclosed in Figure 1.

Figure 4 is an end elevational view of the gear rack of the device showing the manner for guiding the gear segment thereon.

Figure 5 is a plan view of a modified form of the invention partially in cross section.

Figure 6 is a cross sectional view of the pivot post of the device shown in Figure 5 taken along line 6—6 of Figure 5.

Figure 7 is a cross sectional view taken along line 7—7 of Figure 5.

Figure 8 is a side elevational view of another modified form of the invention wherein the power blades are mounted off center for producing their rotation.

Figure 9 is a vertical cross sectional view taken along line 9—9 of Figure 8.

Figure 10 is a vertical cross sectional view taken along line 10—10 of Figure 8.

Figure 11 is a top plan view of slightly different arrangement of the device disclosed in Figure 8 as applied to a three-bladed wind power unit.

Figure 12 is a vertical cross sectional view taken along line 12—12 of Figure 11.

Figure 13 is a vertical cross sectional view taken along line 13—13 of Figure 11.

As disclosed in Figures 1 to 4 the device of this invention consists of a bracket or turntable member 10 that is supported by a power shaft 11. A bearing member 12 is provided between a shoulder 13 on the power shaft 11 and a shoulder 14 provided on a support housing 15. The bearing member 12 is preferably a lubricant sealed ball bearing member so that it can operate over prolonged periods of time without attention. A center support post 16 is secured to the turntable 10 by means of bolts 17, the post 16 having a hollow interior 18, a closed top wall 19 and a transverse partition 20.

Support members 21 and 22 are provided on opposite ends of the turntable 10 and support gear segments 23 and 24, respectively. Pinions 25 and 26 are provided for rotation upon the gear segments 23 and 24, respectively and are adapted to support one end of each of the power blades 27 and 28.

A shaft 29 extends from the pinion 25, rigid therewith, which engages the power blade 27 and the end thereof is provided with a yoke 30 that extends over the edge of the power blade 27 and is secured thereto by rivets 31 or other suitable means. A similar shaft 32 extends from the pinion 26 and engages the edge of the power blade 28 being fastened thereto by means of the rivets 33.

The opposite edges of the power blades 27 and 28 are provided with shafts 34 and 35, respectively, that are secured to the edge of the blades by means of the yokes 36 and 37. The shaft 34 extends through the bearings 38 provided in a yoke 39 that is pivotally mounted on the transverse wall 20 by means of the yoke pivot pin 40, the yoke being retained in position upon the transverse wall 20 by means of the nut 41.

The shaft 35 extends through the bearings 42 provided in a similar yoke 43 that is pivotally sustained from the top wall 19 of the support post 16 by means of the yoke pivot pin 44, the nut 45 retaining the yoke 43 in position upon the top wall 19. A sprocket chain 46 extends over suitable sprockets that are carried upon the shafts 34 and 35, respectively, these sprockets being secured to the shafts 34 and 35 to rotate therewith.

The pinions 25 and 26 heretofore referred to as co-operating with the gear segments 23 and 24 are provided with an arcuate protrusion 47 extending from each of the pinions 25 and 26, one of the pinions being shown in Figure 4 in more detail. The protrusion 47 engages a groove 48 provided longitudinally in a bar 49 that extends across the top of the gear segments 23 and 24, the end walls 50 and 51 of the gear segments providing means for stopping travel of the pinion upon the gear segment, as well as providing the support means for the guide bar 49.

Assuming the wind to be moving in the direction of the arrow, as shown on Figure 1, the power blades 27 and 28 will be in the position, as shown on Figure 1, the pinions 25 and 26 being positioned against the end walls 51 whereby the power blade 28 cannot rotate any further and will stand in a vertical position to receive the full force of the wind until it has moved to a position substantially parallel to the wind. At this time the power blade 27 is approaching the position wherein the wind may strike the same and which changes its position from that of being parallel to the wind to a position wherein it will be at right angles to the wind. As the momentum of the device carries it around so that the power blade 27 is then on the right-hand side of the figure, as viewed in Figure 1, the wind will strike the blade and tend to rotate the same from a position parallel to the wind to a position at right angles to the wind. As soon as the wind catches the lower edge of the power blade 27 it will rotate because the pinion 25 will be against the wall 51 and can rotate across the gear segment 23 until it strikes the end wall 50. Similarly, when the power blade 28 moves from the right to the left, or counterclockwise, as viewed in Figure 1, and tends to rotate into the wind, the pinion 26 will leave the end wall 51 and will rotate over the gear segment 24 until it strikes the end wall 50 whereby the power blade 28 will be changed from a position at right angles to the wind to a position parallel to the wind. Under these conditions the power blades 27 and 28 will have altered their position from that shown in Figure 1. When the power blade 28 tends to move with the wind when approaching the wind on the left-hand side of the device, as viewed in Figure 1, it will rotate the sprocket carried upon the shaft 25 and thereby rotate the chain 46 to rotate the sprocket carried upon the shaft 34 and initiate lifting the forward edge of the power blade 27 so that the wind can then pick up the power blade 27 and continue to lift the same until it is in a position at right angles to the wind.

Under certain circumstances the movement of the wind may be relatively light and under these conditions the movement of the power blade 28 would complete the rotation of the power blade 27 upon the axis provided by the shafts 35 and 29 to place the same into power position so that regardless of the strength of the wind the power blades 27 and 28 will alternately place one another into power position at right angles to the direction of movement of the wind when the blades are on the right-hand side of the device as viewed in Figure 1.

If the wind should suddenly shift its direction of movement so that it would come from the opposite direction from that indicated by the arrow on Figure 1, the power blade 28 would immediately tend to move clockwise about the support post 16 until the pinion 27 engages the end wall 50. This movement would rotate the power blade 27 to bring its power position at right angles to the direction of movement of the wind so that even though the wind directions should suddenly change the direction of rotation of the wind power unit would remain constant in one direction.

From the foregoing operation it will be understood that the shafts 34 and 35 on the power blades 27 and 28 rotate the yokes 39 and 43 upon their pivots 40 and 44, respectively when shifting from one position to the other so that the openings 52 and 53 are in the nature of elongated slots to provide for the movement of the shafts 34 and 35 during the operation of the device.

It is to be understood, of course, that the rotation of the turntable 10 drives the power shaft 11 which can be connected to any suitable device that is to be driven by a power source. It will also be recognized that the device of this invention is capable of producing a greater quantity of power for a given size than conventional wind power devices because none of the blades of the device oppose the force of the wind during its operation.

In Figures 5 to 7 there is shown a modified form of apparatus wherein the turntable, or turn bar 60, carries a power shaft 61 that is supported within a support housing 62, whereby the power shaft 61 forms the axis of rotation for the turn bar 60. The power blades 63 and 64 are provided on opposite sides of a center support member 65 that extends upwardly from the turntable or turn bar 60.

The power blades 63 and 64 are supported at opposite ends of a shaft 66, at right angles to one another, that extends through an elongated slot 67 provided in the center support 65. Suitable collars 68 are secured to the shaft 66 to position the same within the center support 65 and to prevent axial movement of the shaft 66.

The power blade 63 is provided with a pivot shaft 69 secured on the end thereof that extends through a pivot bearing 70 and is prevented from axial movement by means of the nut 71. The pivot bearing 70 consists of a vertical support member 72 that has a shaft 73 extending therefrom which passes through the turntable or turn bar 60, as shown in Figure 6, and is retained in position by means of the nut 74. The pivot bearing 70 can thereby rotate upon the axis of the shaft 73 when the power blade 63 oscillates in a manner that will be hereinafter described.

The power blade 64 carries a shaft 75 that has a pinion 76 positioned upon the shaft 75 and freely rotatable thereon, the pinion 76 being retained on the shaft 75 by means of the nut 77. The pinion 76 engages an arcuately shaped rack 78 that is secured to the turntable or turn bar 60.

The operation of the device disclosed in Figure 5 is such that rotation of the turn bar 60 will alternately change the positions of the power blade 63 and 64 from a position parallel to the wind to a position at right angles to the wind. Assuming the wind to be travelling in the direction of the arrow, as shown in Figure 5, the power blade 64 is in a position to receive the full force of the wind and the pinion 76 will be against the stop 79 provided on the end of the rack 78, whereby the device will be rotated counterclockwise about the axis of the shaft 61.

When the device rotates so that the power blade 64 begins to move to the left-hand side of the figures, as viewed in Figure 5, so that the wind will be striking the opposite face of the power blade 64, the wind will drive the blade 64 to cause the blade 64 and the blade 63 to rotate the bearing pivot 70 about its axis 73 until the pinion 76 engages the stop 80 on the end of the rack 78. Rotation of the pinion 76 over the rack 78 will produce rotation of the power blades 63 and 64 upon the axis of the shafts 69 and 76 whereby the power blade 63 that is entering the right-hand side of Figure 5 will be positioned at right angles to the wind while the power blade 64 that is entering the left-hand side of Figure 5 will be positioned parallel to the wind, whereby the power blade 63 will be driven by the wind and continue rotation of the wind power mechanism.

In Figures 8, 9 and 10 there is disclosed another modified arrangement of the wind power mechanism wherein the turntable or turn bar 90 is secured to a power shaft 91 carried within the support housing 92, which power shaft 91 provides the axis of rotation for the turntable or turn bar 90. Power blades 93 and 94 are secured to opposite ends of a shaft 95 that is rotatably mounted in the central support post 96 and is provided with collars 97 that prevent axial movement of the shaft 95. The opposite ends of the power blades 93 and 94 are provided with support shafts 98 and 99, respectively, that are journaled in the end support members 100 and 101, respectively.

The power blades 93 and 94 are mounted to the shafts 95, 98 and 99 so that these shafts are in coaxial alignment and the blades are positioned at right angles to one another. The power blades 93 and 94 are also mounted so that a line through the axis of their shafts is substantially below the middle point between the top and bottom edges of the power blades as shown on the power blade 94 in Figure 8, the area of the upper portion A of the power blade 94 being substantially greater than the area of the lower portion B. When the power blade 93 is in a vertical position the same area relationship holds true.

The shaft 99 for the power blade 94 carries arm 102 that is rigidly secured thereto for rotation with the shaft 99 that is adapted to alternately engage the stop pins 103 and 104 carried in the member 101. A similar arm 105 is non-rotatably secured to the shaft 98 for engaging the stop pins 106 and 107 provided in the end member 100.

The operation of the device as disclosed in Figures 8 to 10 is such that the movement of the wind will cause the power blades to assume their power position alternately as the blades rotate about the axis of the power shaft 91. Assuming the wind to be moving in a direction to strike the face of the power blade 94, as shown in Figure 8, which would be the same wind direction as that indicated by the arrows on Figures 9 and 10, the power blades 93 and 94 will be in their positions as shown in Figure 8 with the arms 102 and 105 against the stop pins 104 and 107, respectively. The wind, therefore, expands its force upon the blade 94 to drive the turntable or turn bar 90 and thus rotate the power shaft 91. When the power blade 94 recedes, due to movement of the wind, and begins to swing to the left-hand side of the device, as viewed in Figure 8, the wind will strike the opposite face of the power blade 94 from that which is exposed in Figure 8, and due to the increased area A on the upper side of the axis of rotation of the power blade 94 will cause the blade 94 to rotate in a clockwise direction as viewed in Figure 9, the wind at that time striking the face of the blade in a direction as indicated by the dotted arrow on Figure 9. Since the spaced area A of the blade 94 is greater than the area B the blade will rotate until the arm 102 strikes the stop pin 103. The initial rotation of the blade 94 rotates the shaft 95 to elevate the edge 108 of the blade 93 at a time that the blade is beginning to enter the area on the right-hand side of the device as viewed in Figure 8. As soon as the edge 108 of the blade 93 is elevated the wind will engage the under face of the blade 93 as viewed in Figure 10, to rotate the blade 93 in a clockwise direction as viewed in Figure 10, until the arm 105 strikes the stop pin 106. This is due to the fact that the upper area A on the blade 93 is greater than the lower area B. It will thus be seen that the large areas A on both blades 93 and 94 aid one another in alternately placing the blades in their power position as shown in Figure 8.

In Figures 11 to 13 there is shown a slightly modified arrangement of the apparatus as disclosed in Figure 8 wherein each of the power blades is independently mounted and functions independently of the other.

In this device there are three power blades 110, 111 and 112 that are mounted radially about the center support post 113 and equidistantly from one another. The support post 113 is mounted upon the turntable 114 that is provided with radially extending arms 115, 116 and 117, the turntable 114 being secured to a suitable power shaft which is supported in a suitable housing which is heretofore described with regard to other figures of this invention.

The power blades 110, 111 and 112 are mounted between the center support post 113 and the end members 118, 119 and 120, respectively, on the arms 115, 116 and 117 in a manner similar to that heretofore described with regard to the power blades as shown in Figure 8. The difference in mounting being that each of the power blades is rotatable upon its own axis independently of the operation of the other power blades. The power blade 110 is provided with a control arm 121 for regulating the degree of rotation thereof that operates between the stop pins 122 and 123 provided in the end member 119. The power blade 111 is provided with a similar actuating arm 124 that operates between the stop pins 125 and 126 and the power blade 112 is provided with the actuating arm 127 that operates between the stop pins 128 and 129.

The axis of rotation of each of the power blades 110, 111 and 112 is below the middle point between the upper and lower edges of the power blades so that the upper area A' is greater than the lower area B', as shown in Figure 12. However, the power blades are so arranged that they do not reach a position that is exactly parallel to the wind as heretofore described with regard to the other modified forms of the invention. In the arrangement as disclosed in Figure 11 the power blades are arranged so that when their control arms 121 are against the co-operating stop pin to position the blade, as shown in Figure 13, the edge 130 is disposed slightly above a normal horizontal position, for instance, about five degrees as illustrated in Figure 13. When the blades are in the position as shown in Figure 13, the edge 130 is the trailing edge of the blade, but when the blade rotates to a position wherein it is in the right-hand side of the device, as viewed in Figure 11, the edge 130 becomes the leading edge, that is insofar as the direction of movement of the air toward the device is concerned.

The operation of the device will be apparent from this description since it functions in the same manner as the device disclosed in Figure 8 except that each power blade operates independently, and can act independently of the other power blades because the inclination given to the power blades when entering the power side of the device is such that the wind will strike the underside of the power blade and lift the same upwardly by the force supplied on the upper edge A' of the blade. Also, the device as shown in Figure 11 has the advantage of having at least one power blade in full power position at all times.

While the apparatus disclosed and described herein constitutes preferred forms of the invention, yet it is to be understood that the apparatus is capable of mechanical alteration without departing from the spirit of the invention, and that all such modifications as fall within the scope of the appended claims are intended to be included herein.

Having thus fully described my invention what I claim as new and desire to secure by Letters Patent is:

1. A wind power mechanism including a rotatable platform, a central support member normal to said platform, end support members on the same side of said platform as said central support spaced radially from said central support member and normal to the platform, blade means positioned between said central support member and the end support members positioned axially at right angles to one another, shaft means rotatably supporting said blade means between said central support member and said end support members, gearing means interconnecting the shaft support means for the blade means to maintain them in a predetermined angular relationship, and means operably connecting the shaft means to said end support members for controlling horizontal planar rotation of said blade means relative to said rotatable platform to alternately position the same into power position at right angles to the direction of air movement against the blades comprising a pinion and a rack of predetermined length.

2. A wind power mechanism including a rotatable platform adapted to be connected to a mechanism to drive the same, a pair of power blades positioned axially at right angles to one another and including fastening means for retaining the same in this position, support members carried by said platform for supporting opposite ends of the pair of blade means, one of said support members being pivotally connected to the platform to permit the pair of blade members to rotate thereabout, and the other support member including means for rotating said blades axially to position the blades between two extreme positions one of which is at right angles to air attack to the blade and the other of which is parallel to air attack to the blade, said last mentioned means including a pinion and a rack of predetermined length to control the axial rotation of the blade means.

3. In a wind power mechanism, rotatable means adapted to be connected to a mechanism for driving the same, shaft means extending longitudinally along the longitudinal center line of blade means supported thereby which are rotatable on their own horizontal axis to position the same either normal or parallel to the movement of air thereagainst for applying power impulses to said rotatable means, means mounting each of the shaft means upon said rotatable means for horizontal planar movement thereof radially relative to the axis of the rotatable means, means interconnecting cooperating pairs of said blade means for causing rotation of the blade means upon their own axes when horizontal movement thereof relative to the axis of the rotatable means is occasioned to thereby alternately position each of the blade means in a power position to receive a power impulse from a source of air supply to thereby rotate said rotatable means, means on said shaft means operably connected to said rotatable means for rotating said shaft means upon occasioning of said horizontal movement thereof to change the angular position of said blade means in space, and means to control the extent of said longitudinal movement of the said shaft to control the rotation thereof and thus the extent of the change of the angular spatial position of the blade means.

4. In a wind power mechanism, rotatable means adapted to be connected to a mechanism for driving the same, shaft means extending longitudinally along the longitudinal center line of blade means supported thereby which are rotatable on their own horizontal axes to position the same either normal to or parallel to the movement of air thereagainst for applying power impulses to said rotatable means, means mounting each of the shaft means upon said rotatable means for horizontal planar movement thereof radially relative to the axis of the rotatable means, means interconnecting cooperating pairs of said blade means for causing rotation of the blade means upon their own axes when horizontal movement thereof relative to the axis of the rotatable means is occasioned to thereby alternately position each of the blade means in a power position to receive a power impulse from a source of air supply to thereby rotate said rotatable means, and means on said shaft means operably connected to said rotatable means for rotating said shaft means upon occasioning of said horizontal movement thereof to change the angular position of said blade means in space.

RAYMOND D. BOURNE.

REFERENCES CITED

The following references are of record in the file of this patent:

UNITED STATES PATENTS

| Number | Name | Date |
|---|---|---|
| 325,025 | Tefft | Aug. 25, 1885 |
| 1,915,689 | Moore | June 27, 1933 |
| 2,006,024 | Lockwood | June 25, 1935 |
| 2,085,411 | Biehn | June 29, 1937 |
| 1,844,796 | Royak | Feb. 9, 1932 |
| 261,985 | Beardsley | Aug. 1, 1882 |

FOREIGN PATENTS

| Number | Country | Date |
|---|---|---|
| 623,361 | Germany | Dec. 19, 1935 |
| 523,750 | France | Aug. 24, 1921 |